United States Patent [19]
Maenner

[11] 3,888,162
[45] June 10, 1975

[54] APPARATUS FOR GENERATING PROPORTIONAL CAMS FROM A MASTER CAM

[76] Inventor: Paul Maenner, 2959 Scarborough Rd., Cleveland, Ohio 44118

[22] Filed: May 22, 1974

[21] Appl. No.: 472,161

[52] U.S. Cl. .................. 90/13.1; 90/13.6; 33/23 R
[51] Int. Cl. .............................................. B23c 1/18
[58] Field of Search ......... 90/13.1, 13.8, 13.6, 13.9, 90/58 R; 33/24 R, 23 R, 23 H; 51/100 R, 101 R

[56] References Cited
UNITED STATES PATENTS

| | | | |
|---|---|---|---|
| 1,313,543 | 8/1919 | Keller | 90/13.1 |
| 3,160,068 | 12/1964 | Beezer | 90/13.1 |
| 3,742,816 | 10/1970 | Carnahan | 90/13.1 |

*Primary Examiner*—Gil Weidenfeld
*Attorney, Agent, or Firm*—Watts, Hoffman, Fisher & Heinke Co.

[57] ABSTRACT

A cam generating apparatus includes two slides movable in mutually perpendicular directions on a base. One of the slides, called the X-direction slide, carries a master cam. The other slide, called the Y-direction slide, carries a cam follower which engages and follows the contour of the master cam. A pair of adjustable proportioning arms connect one with each of the slides to provide X-and Y-direction outputs which are proportional to the movements of the slides. These outputs drive a cam blank relative to a cutter to generate a cam contour having an amplitude and a length which are proportional to the configuration of the master cam. Cams of several types including rotating and non-rotating cams can be generated from the same master cam, depending on how the outputs are connected to move the cam blank.

12 Claims, 15 Drawing Figures

APPARATUS FOR GENERATING PROPORTIONAL CAMS FROM A MASTER CAM

CROSS-REFERENCE TO DISCLOSURE DOCUMENT

The present invention is described in Disclosure Document No. 010986 filed in the Patent Office May 25, 1972.

BACKGROUND OF THE INVENTION

1. Field of the Invention

The present invention relates to the precision machining of contoured surfaces, and more particularly to an apparatus for generating cams of many proportionately different configurations from a master cam.

2. Prior Art

A number of apparatuses have been proposed to facilitate the formation of cams from a master cam. Many of these proposals require that the master cam have the exact desired configuration of the cam to be formed. Other proposed devices permit the use of a proportionately smaller or larger master cam, but suffer one or more of the following drawbacks:

a. Either cam amplitude or cam length can be proportionately changed from that of the master cam, but not both.

b. There is some compromise in proportioning accuracy which distorts the contour of the generated cam from the true proportions of the master cam.

c. Changing master cams to generate a different type of motion is cumbersome.

d. The apparatus is not sufficiently versatile to generate such diverse types of cams as contoured non-rotating cams, rotating disc cams, and rotating barrel cams.

SUMMARY OF THE INVENTION

The present invention overcomes the foregoing and other drawbacks of the prior art and provides a novel and improved apparatus for generating cams of many proportionally different configurations from a master cam.

A base structure carries two slides which are movable in mutually perpendicular directions. One of the slides, called the X-direction slide, carries a master cam. The other slide, called the Y-direction slide, carries a cam follower which engages and follows the contour of the master cam. When the master cam-carrying or X-direction slide is translated longitudinally, the follower-carrying or Y-direction slide is moved in perpendicular directions in accordance with the configuration of the master cam.

A pair of proportioning arms connect one with each of the slides. Each of the proportioning arms is infinitely adjustable within a predetermined range to provide an output movement having a magnitude that is proportional to the movement of its associated slide. The output movements of the proportioning arms move a cam blank relative to a cutter to generate a cam having a configuration which is proportional to the master cam. The proportional outputs can produce a cam which is proportionally larger or smaller than the master cam.

Contoured non-rotating cams are generated by connecting the outputs of the proportioning arms to a cam blank to rectilinearly translate the blank beneath a cutter. The X-direction output is connected to move the cam blank in X-directions, and the Y-direction output is connected to move the cam blank in Y-directions.

Rotating disc cams and barrel cams are generated by connecting one of the outputs of the proportioning arms to a cam blank for rotating the cam blank about an axis. The other output is connected to either move the cam blank along its axis of rotation, or to translate the rotation axis.

One feature of the invention is the construction of the proportioning arms. Whereas, most prior art proportioning proposals compromise proportioning accuracy and introduce some resultant distortion in the contour of generated cam, the arms used with the present invention provide accurate proportioning without compromise.

Another feature is the versatility of the apparatus which permits the generation of many different types of cams including rotating and non-rotating cams, from the same master cam.

Still another feature is the ease with which master cams can be changed. In the preferred embodiment, the master cams are each formed as a groove in a separate rectangular metal plate. Typically, one master cam is provided which has a simple harmonic motion contour. Separate master cams are provided having other motion contours such as cycloidal, parabolic, etc. Master cams are changed simply by removing one and attaching the desired new master cam to the X-direction slide.

The ease with which master cams are changed facilitates the generation of complex cams employing a series of different motions selected from various master cams. The curves of the generated cam can be finished in one manufacturing step and may, for example, include simple harmonic, straight line, and cycloidal motion in sequence.

Still another advantage of the invention is that the motions derived from the master cam can be used to simultaneously drive several cam blanks relative to separate milling cutters to simultaneously generate a plurality of identical cams.

It is a general object of the present invention to provide a novel and improved apparatus for generating cam contours from a master cam.

Other objects and a fuller understanding of the invention may be had by referring to the following description and claims taken in conjunction with the accompanying drawings.

DESCRIPTION OF THE PREFERRED EMBODIMENT

Figure 1:
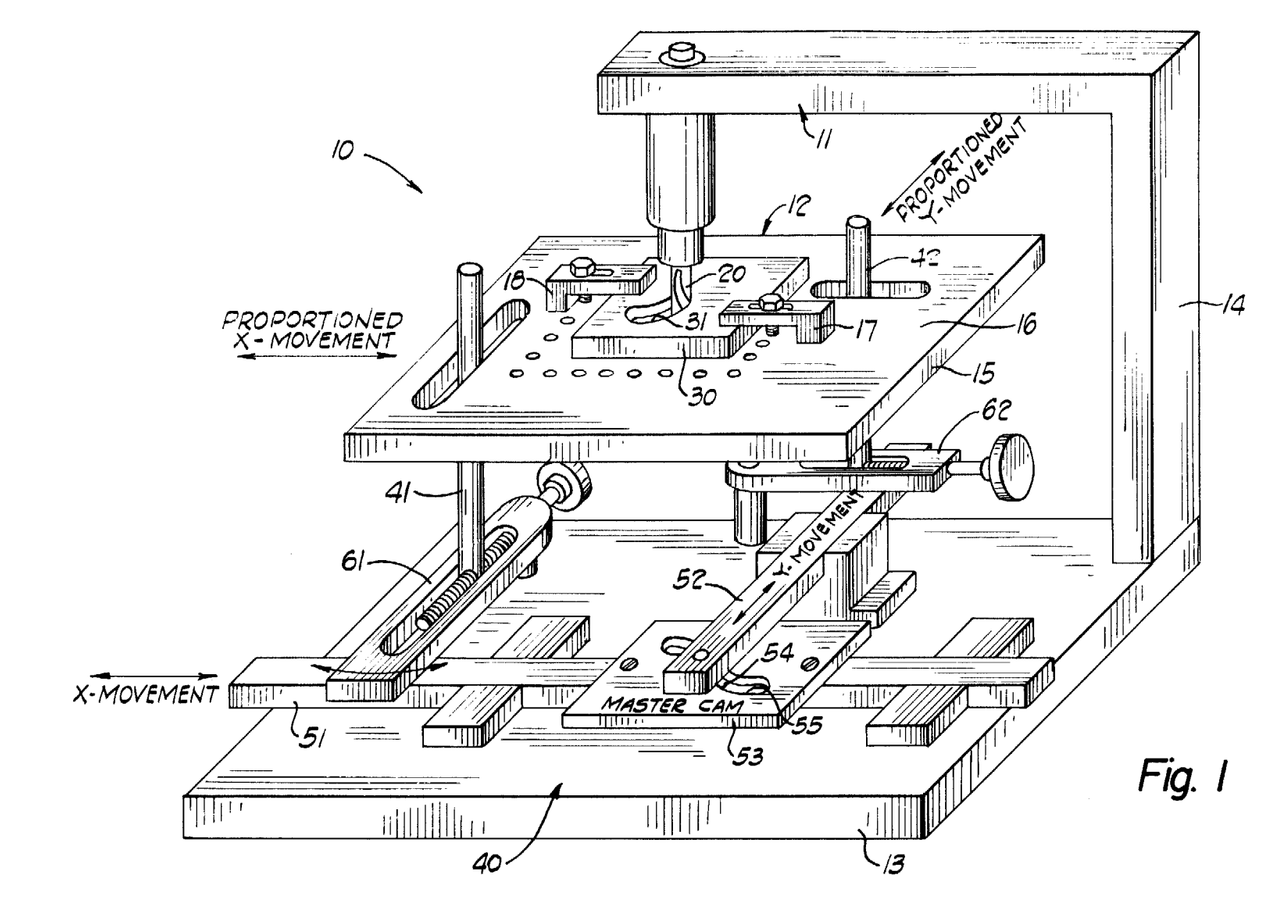
FIG. 1 is a schematic perspective view illustrating the relationship between several of the major components of a cam generating apparatus constructed in accordance with the present invention.

A simplified schematic showing of several elements of the preferred embodiment is presented at FIG. 1. Referring to FIG. 1, a cam forming apparatus is shown schematically at 10. The apparatus 10 includes a cam cutter support 11 and a cam blank support 12. The cam cutter support 11 includes a base plate 13 and an upstanding mount 14. The cam blank support 12 includes a mounting plate 15 which defines an upwardly facing support surface 16. The plates 13, 15 are connected by a mechanism (not shown in FIG. 1) which permits their relative movement, as will be described in greater detail in conjunction with subsequent FIGURES.

A cutter 20 is rotatably carried by the upstanding mount 14. The cutter 20 shown in FIG. 1 is a rotating end milling cutter which overlies the support surface 16.

A cam blank 30 is positioned on the support surface 16. A pair of clamps 17, 18 hold the cam blank 30 in place on the cam blank support 12. As the cam blank 30 moves relative to the cam blank 30, a cam contour in the form of a groove 31 is cut in the blank 30.

A drive system, indicated generally by the numeral 40, is interposed between the supports 11, 12 to relatively move the supports 11, 12. The drive system 40 includes a pair of driven members 41, 42, which drivingly connect with the cam blank support 12. The driven member 41 is arranged to drive the mounting plate 15 in an X-direction, while the driven member 42 is arranged to drive the mounting plate 15 in a perpendicular Y-direction. Either of the driven members 41, 42 can be moved independently of the other to orthogonally drive the mounting plate 15, and both of the driven members 41, 42 can be moved together to concurrently move the mounting plate 15.

A pair of drive members 51, 52 are slidably carried on the base plate 13. The drive member 51 is a slide which is reciprocally movable in X-directions. The drive member 52 is a slide which is reciprocally movable in Y-directions.

A master cam 53 is carried on drive member 51. A cam follower 54 is carried on the drive member 52. A contoured cam surface in the form of a groove 55 is defined by the master cam 53. The cam follower 54 engages the cam surface 55. The shape of the cam surface 55 controls the Y-direction movements made by the drive member or Y-direction slide 52 in response to X-direction movements of the drive member or X-direction slide 51.

A pair of proportioning arms 61, 62 interconnect the drive members 51, 52 with the driven members 41, 42. The proportioning arm 61 drives the driven member 41 in X-directions in proportion to X-direction movements of the drive member 51. The proportioning arm 62 drives the driven member 42 in Y-directions in proportion to the Y-direction movements of the drive member 52.

The proportioning arms 61, 62 are adjustable, as will be explained, to permit the ratios of the movements executed by the drive members 51, 52 and the driven members 41, 42 to be selectively changed. By adjusting the ratio of the X-direction proportioning arm 61, the X-direction length of the cam surface or groove 31 cut in the cam blank 30 is selected. By adjusting the ratio of the Y-direction proportioning arm 62, the amplitude of the cam surface or groove 31 cut in the cam blank 30 is selected.

Figure 2:
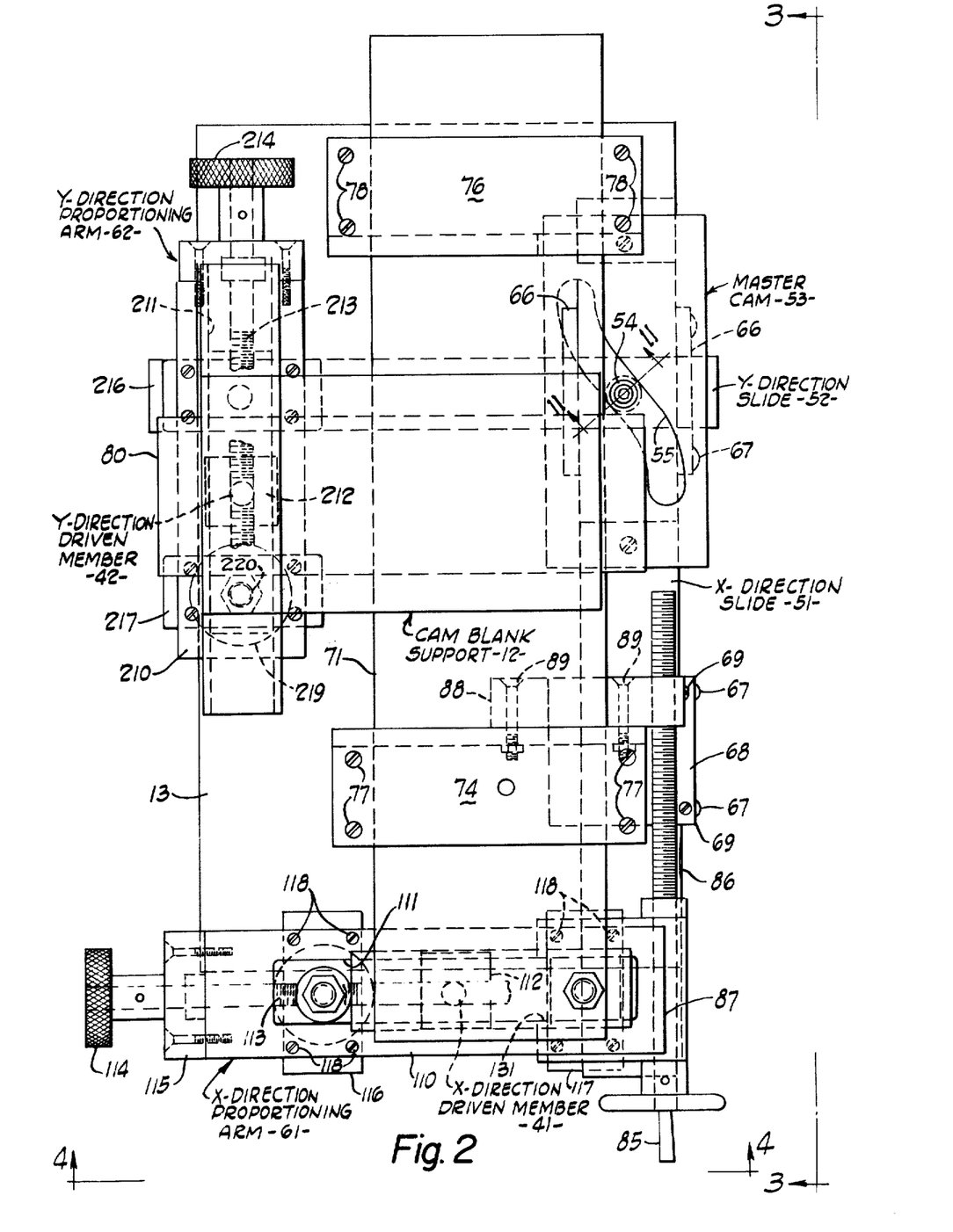
FIG. 2 is a top plan view of an apparatus embodying the invention.
Figures 3, 4:
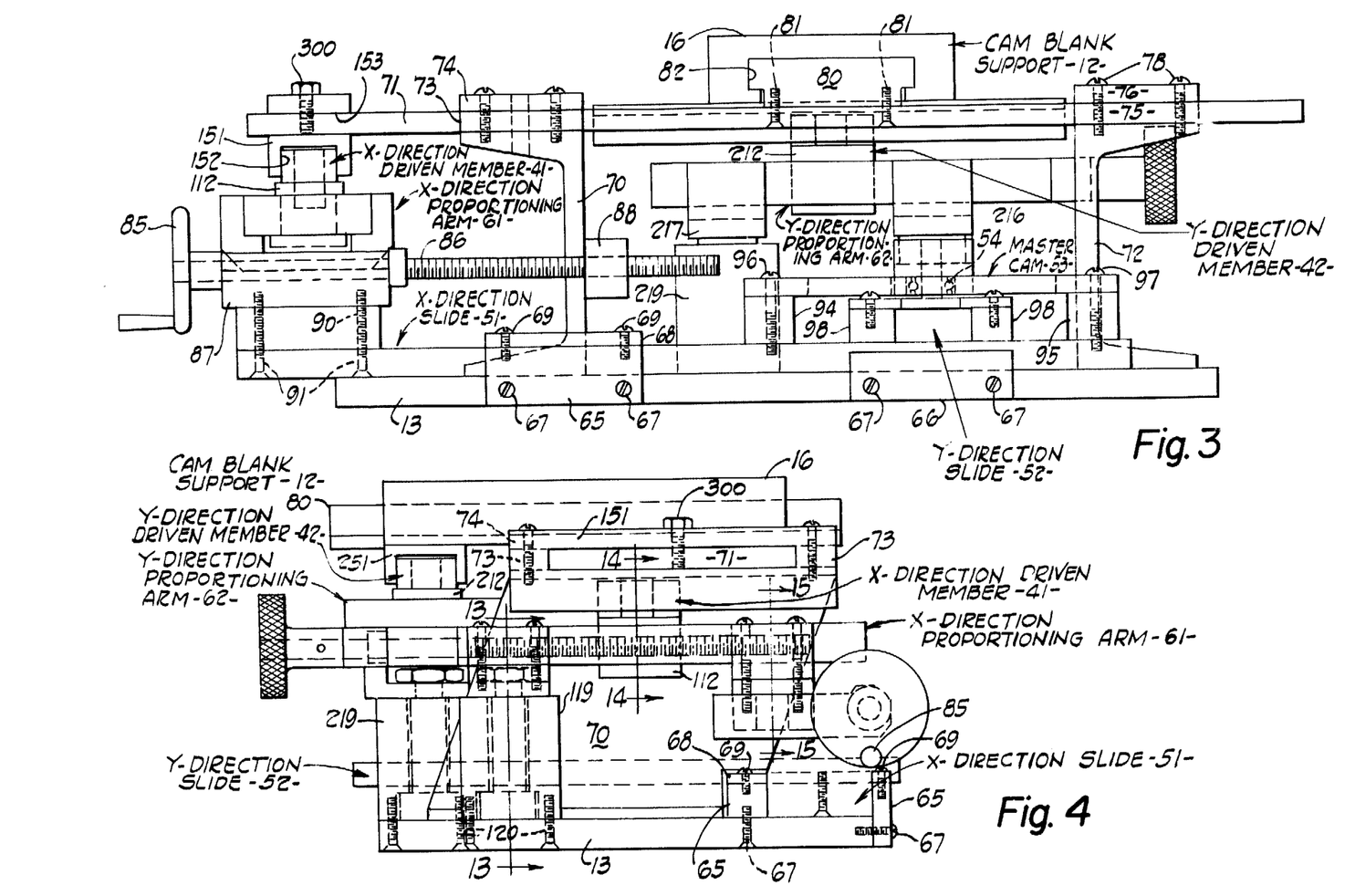
FIG. 3 is a side elevational view of the apparatus of FIG. 2 as seen from the plane indicated by the line 3—3 in FIG. 2.
FIG. 4 is an end elevational view of the apparatus of FIG. 2 as seen from the plane indicated by the line 4—4 in FIG. 2.

Referring to FIGS. 2–4, the actual construction of the preferred embodiment is shown. The same reference numerals used in FIG. 1 are used on corresponding components in FIG. 2.

The base plate 13 is a rectangular steel plate which underlies and supports most of the other elements of the apparatus 10. In the preferred embodiment, the base plate 13 is provided with suitable mounting holes (not shown) for securing the base plate to the bed of a milling machine or other conventional apparatus having a capability for cutting a contoured cam surface on a cam blank.

The X-direction slide or driving member 51 is a steel bar which rests atop the base plate 13. Two pairs of spaced guide blocks 65, 66 engage the sides of the X-direction slide 51 and confine its movement to translation in X-directions. Threaded fasteners 67 secure the guide blocks 65, 66 to the base plate 13. A guide plate 68 overlies the slide 51 and holds it against the base plate 13. Threaded fasteners 69 secure the guide plate 68 to the guide blocks 65.

A pair of channel-shaped uprights 70, 72 are welded to the base plate 13. The uprights 70, 72 each have upstanding webs which extend between spaced top and bottom flanges. The top surfaces of the uprights 70, 72 define a planar surface.

A steel support bar 71 is movably carried atop the uprights 70, 72. Two pairs of guide blocks 73, 75 rest atop the uprights 70, 72 and engage the sides of the support bar 71. Two guide plates 74, 76 overlie the guide blocks 73, 75. Threaded fasteners 77, 78 secure the guide plates 74, 76 and the guide blocks 73, 75 to the uprights 70, 72. The guide blocks 73, 75 and guide plates 74, 76 cooperate to confine the movement of the support bar 71 to X-directions.

A guide block 151 is connected to the left end region of the support bar 71, as viewed in FIG. 3. The support bar 71 extends through a slot 153 formed in the guide block 151. A cap screw 300 is threaded through aligned holes in the guide block 300 and the support bar 71 to releasably connect these members. A slot 152 is formed in the underside of the guide block 151 to receive the X-direction driven member 41. As will be explained later, X-direction movement of the support bar 71 is effected by the proportioning arm 61 which moves the driven member 41.

A guide track 80 of T-shaped cross section is carried by the support bar 71 at a position intermediate the uprights 70, 72. Threaded fasteners 81 secure the guide track 80 to the support bar 71. The guide track 80 extends perpendicular to the longitudinal axis of the support bar 71.

The guide track 80 slidably mounts the cam blank support 12 for movement in Y-directions. The cam blank support 12 has a downwardly opening T-shaped groove 82 configured to slidably engage the T-shaped guide track 80. The sliding connection established by the guide track 80 between the support bar 71 and the cam blank support 12 will cause the cam blank support 12 to move with the support bar 71 in X-directions while permitting independent movement of the support bar 71 and the cam blank support 12 in Y-directions.

A handwheel 85 is provided to move the X-direction slide or drive member 51 in X-directions. A shaft 86 is rotated by the handwheel 85. The end region of the shaft 86 nearest the handwheel is journaled for rotation in a bearing block 87. The other end region of the shaft 86 is threaded. A threaded nut 88 is secured to the upright 70 by threaded fasteners 89. The shaft 86 is threaded through the nut 88.

A spacer block 90 is interposed between the bearing block 87 and the X-direction slide 51. Threaded fasteners 91 secure the spacer block 90 and the bearing block 87 to the X-direction slide 51. When the handwheel 85 is rotated causing the shaft 86 to thread through the nut 88, the connection between the bearing block 87 and the X-direction slide 51 causes the slide 51 to move in X-directions.

The master cam 53 is secured to the X-direction slide 51. A pair of spacers 94, 95 are carried at spaced positions on the X-direction slide 51. The master cam 53 rests on the spacers 94, 95. Threaded fasteners 96, 97 extend through holes near opposite ends of the master cam 53 and through the spacers 94, 95 to secure the master cam 53 to the X-direction slide 51.

The Y-direction slide or drive member 52 is a steel bar which is supported for sliding movement relative to the base plate 13 in a manner similar to that of the X-direction slide 51. Suitable guide blocks 98 and an overlying guide plate (not shown) cooperate to confine the movement of the Y-direction slide to directions which are perpendicular to the movement of the X-direction slide 51.

The right end region of the Y-direction slide 52, as viewed in FIG. 2, is slidably carried atop the X-direction slide 51. The cam follower 54 is carried on this end region of the slide 52 and extends upwardly into engagement with the cam surface 55.

Figures 10, 11:
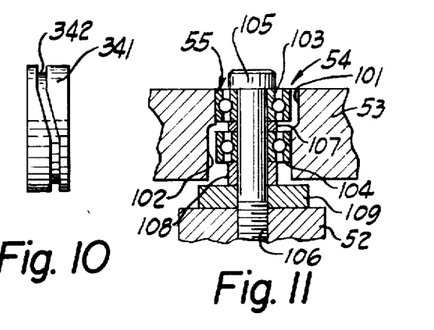
FIG. 11 is a sectional view on an enlarged scale as seen from the plane indicated by the line 11—11 in FIG. 2.

The construction of the cam follower 54 and its engagement with the cam surface 55 is shown in greater detail in FIG. 11. Referring to FIG. 11, the cam surface 55 is a stepped slot or groove which is formed through the master cam plate 53. The stepped cam surface 55 has upper and lower slot portions 101, 102, of equal width which are offset one from the other. The cam follower 54 includes upper and lower ball-bearing rollers 103, 104. The upper roller 103 engages the left wall of the upper slot portion 101, as viewed in FIG. 11. The lower roller 104 engages the right wall of the lower slot portion 102.

A threaded fastener 105 extends through the rollers 103, 104 and is threaded into an aperture 106 in the Y-direction slide 52. Spacer washers 107, 108, 109 are carried on the fastener 105 to axially position the rollers for proper engagement with the slot portions 101, 102. When the cam follower 54 moves in the cam slot 55, the rollers 103, 104 frictionally engage the left and right walls of the slot portions 101, 102, respectively, and rotate in opposite directions. This dual roller, offset-slot construction minimizes wear on the cam follower 54 and the master cam 53.

The connection between the cam follower 54 and the master cam 53 causes the Y-direction slide 52 to move in Y-directions when the X-direction slide 51 is moved in X-directions. The Y-direction movement of the slide 52 is controlled by the shape of the master cam slot 55. By changing master cams configurations, the type of Y-direction movement of the slide 52 which results from X-direction movement of the slide 51 is changed correspondingly.

In practice, a set of interchangeable master cam plates are used. Each of the plates includes a different type of cam movement such as harmonic, parabolic cycloidal, etc. Changing master cam plates is effected by removing the fasteners 96, 97, substituting cam plates, and replacing the fasteners 96, 97.

The proportioning arms 61, 62 transmit X-and Y-direction movements from the slides 51, 52 to the cam blank support 12. Since the proportioning arms 61, 62 are of similar construction, only the X-direction proportioning arm 61 will be described in detail.

Referring to FIGS. 2 and 4, the X-direction proportioning arm 61 includes a rectangular body 110. An end plate 115 is secured to one end of the body 110. A rectangular slot 111 is formed through the body 110. A slide block 112 is carried in the slot 111 and is movable longitudinally of the slot 111. A threaded screw 113 is threaded through the slide block 112. The left end region of the screw 113, as viewed in FIGS. 2 and 4, extends through and is journaled for rotation in aligned apertures in the body 110 and the end plate 115. A knurled knob 114 is connected to the screw 113. When the knob 114 is rotated, the screw 114 turns causing the slide block 112 to move longitudinally of the slot 111.

Two mounting brackets 116, 117 underlie the body 110 near opposite ends of the slot 111. Threaded fasteners 118 secure the brackets 116, 117 to the body 110.

Figure 13:
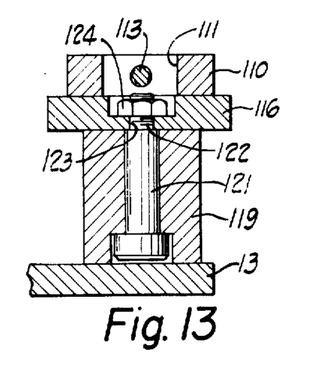

Referring to FIG. 13 together with FIGS. 2 and 4, the bracket 116 is pivotally connected to the base plate 13 to pivotally mount the body 110. An upstanding cylindrical sleeve 119 is interposed between the bracket 116 and the base plate 13. Threaded fasteners 120 secure the sleeve 119 to the base plate 13. A mounting post 121 is rotatably carried in the sleeve 119 and has a threaded upper end region 122 which extends through an aperture 123 in the bracket 116. A nut 124 is threaded onto the end region 122.

Figures 7, 15:
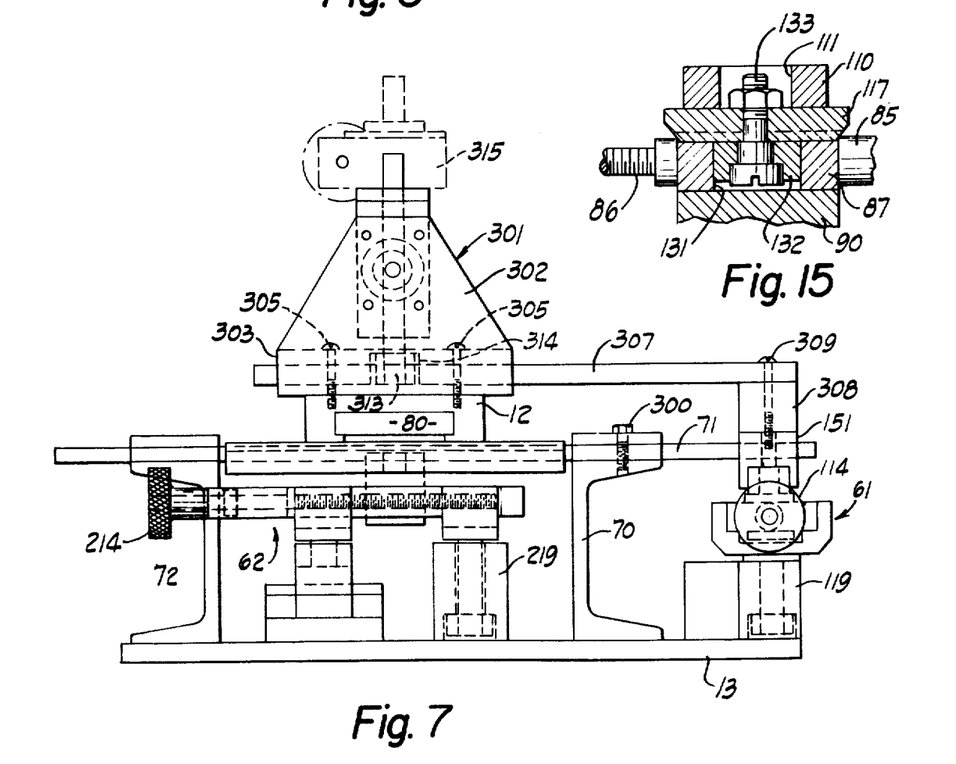
FIG. 7 is a side elevational view of the apparatus of FIG. 5.

Referring to FIG. 15 in conjunction with FIGS. 2 and 4, the bracket 117 is slidably connected to the X-direction slide 51 to pivot the body 110 in response to X-direction movement of the slide 51. The bearing block 87 has a transversely extending slot 131. A slide block 132 is slidably carried in the slot 131 for movement in Y-directions. A threaded fastener 133 extends through aligned holes in the slide block 132 and the bracket 117 to pivotally mount the slide block on the bracket 117.

When the X-direction slide 51 is moved in X-directions by rotation of the handwheel 85, the bearing block 87 moves in X-directions. The pivotal connection between the slide block 132 and the bracket 117 causes the slide block 132 to concurrently pivot about the axis of the mounting post 121. The X-direction component of movement of the slide block 132 is the same as that of the X-direction slide 51. Hence, the X-direction component of movement of the slide block 112 is proportional to the X-direction component of the movement of the X-direction slide 51. The proportioning ratio is adjusted by turning the knob 114 to move the slide block 112 in the slot 111.

Figures 5, 14:
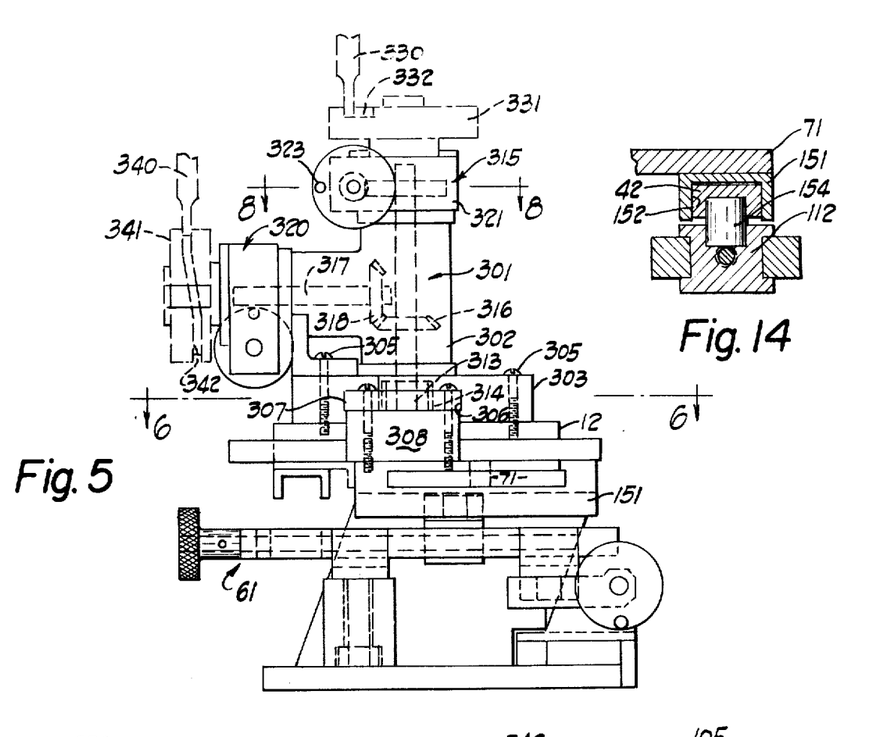
FIG. 5 is an end elevational view on a reduced scale of the apparatus of FIGS. 2–4 as modified to generate rotating cams.
FIGS. 13–15 are enlarged sectional views as seen, respectively, from planes indicated by the lines 13—13, 14—14, and 15—15 in FIG. 4.

Referring to FIGS. 4 and 14, a connection is established between the slide block 112 and the support bar 71 to transmit the X-direction component of movement of the slide block 112 to the support bar 71. A channel-shaped guide 151 is secured to the underside of the support bar 71 and defines a channel 152 which extends in Y-directions. The X-direction driven member 41 is a slide block which is positioned in the channel 152. A pin 154 is positioned in aligned holes in the slide blocks 112, 153 to pivotally connect the slide blocks 112, 153. The sliding connection between the slide block 153 and the guide 151 assures that the only component of movement which can be transmitted from the slide block 112 to the support bar 71 is the X-direction component of movement of the slide block 112.

The Y-direction proportioning arm 62 is quite similar in construction to the X-direction proportioning arm 61 and includes a body 210. A slot 211 is formed in the body 210. A slide block 212 is movably mounted in the slot and is adjusted by a screw 213 connected to a knurled knob 214. Two mounting brackets 216, 217 underlie and are secured to the body 210. A pivotal connection including an upstanding cylindrical sleeve 219 and a mounting post 220 connect the bracket to the body. A sliding connection is formed between the bracket 216 and the Y-direction slide 52. The Y-direction driven member 42 is pivotally connected to the slide block 212 and extends into a guide 251 secured to the cam blank support 12.

Figure 6:
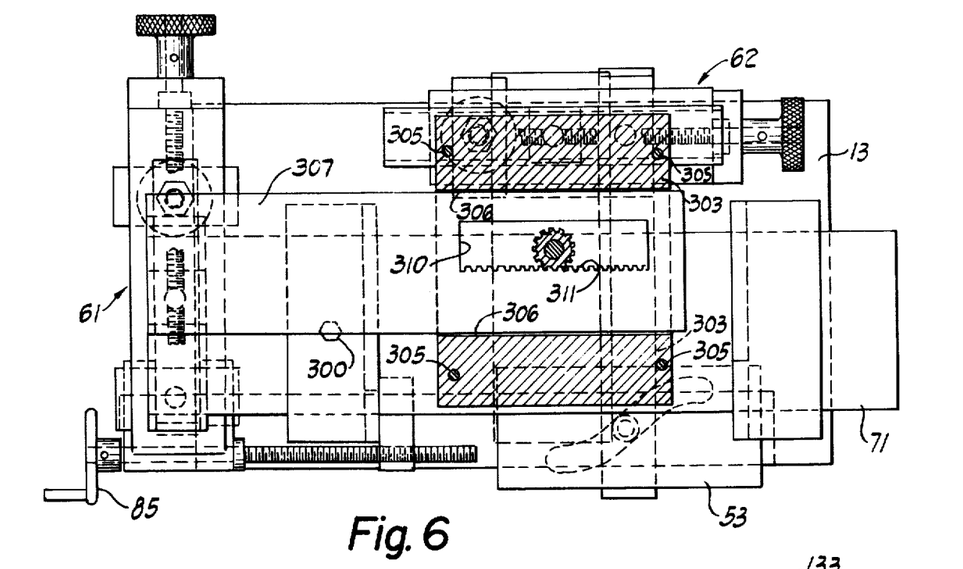
FIG. 6 is a sectional view as seen from the plane indicated by the line 6—6 in FIG. 5.

Referring to FIGS. 5–7, a modified form of the apparatus 10 is shown which has the capability of generating rotatable cams such as disc and barrel cams. In the embodiment of FIGS. 5–7, two changes are made in connecting the output of the X-direction driven member 41 to the cam blank. The first change is that the support bar 71 is disconnected from the X-direction driven member 41 and is instead, secured to the upright 70. As is best seen in FIG. 7, the cap screw 300 is removed from its earlier described position wherein it connected the support bar 71 to the guide block 151. The cap screw 300 is, instead, threaded through aligned apertures in the upright 70 and the support bar 71 to hold the support bar 71 in place relative to the upright 70. The second change is that the X-direction driven member 41 is connected through a rack and pinion drive to a gear box 301 to rotate a cam blank instead of translating it, as was the case in the embodiment of FIGS. 2–4.

The gearbox 301 includes a housing 302. A slotted guideblock 303 is interposed between the support 12 and the housing 302. Threaded fasteners 305 hold the housing 302 and the guide block 303 in place on the support 12.

A horizontal slot 306 extending in X-directions is formed through the guide block 303. A drive bar 307 is slidably carried in the slot 306. One end of the drive bar 307 overlies the guide block 151. A spacer block 308 is interposed between the drive bar 307 and the guideblock 151. Threaded fasteners 309 removably secure the drive bar 307 and the spacer block 308 to the guide block 151 for movement in X-directions with the guide block 151.

Referring to FIG. 6, a rectangular slot 310 is formed in the drive bar 307. A toothed gear rack 311 is formed along one side of the slot 310. The gear rack 311 extends in X-directions for rectilinear movement beneath the gearbox 301 when the drive bar 307 is translated by the guide block 151.

Referring to FIGS. 5 and 7, a shaft 313 extends vertically through the housing 302. The lower end of the shaft 313 depends from the housing 302 and carries a drive pinion 314. The drive pinion 314 meshes with the gear rack 311 and rotates the shaft 313 when the drive bar 307 moves through the slot 306. The upper end of the shaft 313 extends from the housing 302 and connects with a cam blank support assembly 315. A miter gear 316 is carried on the shaft 313 inside the housing 302.

A stub shaft 317 is journaled by the housing 302. A miter gear 318 is carried on the stub shaft 317 and meshes with the miter gear 316. One end region of the stub shaft 317 extends out of the housing 302 and connects with a cam blank support assembly 320.

Figure 8:
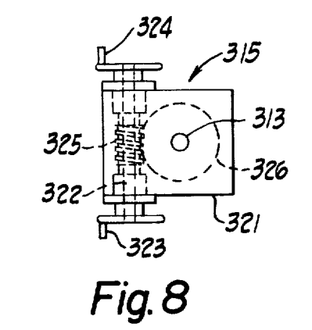
FIG. 8 is a sectional view as seen from the plane indicated by the line 8—8 in FIG. 5.

The cam blank support assemblies 315, 320 are identical in construction. Referring to FIG. 8, the assembly 315 includes a rectangular body 321. A shaft 322 extends through and is journaled by the body 321. Handwheels 323, 324 are carried on opposite ends of the shaft 322. A worm gear 325 is carried on the shaft 322 within the body 321.

A toothed gear 326 is carried on the shaft 313 within the body 321. The gear 326 meshes with the worm gear 325. The meshing connection between the gears 325, 326 cause the body 321 to rotate with the shaft 313. The angular position of the body 321 relative to the shaft 313 can be adjusted by turning either of the handwheels 323, 324.

Figure 9:
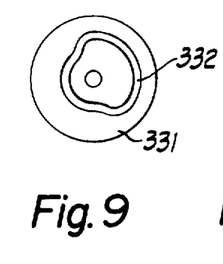
FIGS. 9 and 10 are plan views of two cams which have been generated on the apparatus of FIG. 5.

In operation, a disc cam can be formed on a cam blank secured to the body 321 of the cam blank support assembly 315. As is shown in phantom in FIG. 5, a rotating end milling cutter 330 is used to cut a contoured groove 332 in a cam blank 331 as the cam blank 331 is rotated by the X-direction drive system of the apparatus 10. The resulting cam 331 is shown in FIG. 9. By offsetting the cutter 330 in Y-directions from the axis of rotation of the cam 331, and by varying the amplitude of this offset through the Y-direction drive system of the apparatus 10, a cam groove is generated which has portions that vary in distance from the cam axis.

Alternatively, a barrel cam such as is shown in FIG. 10 can be formed on a cam blank 341 secured to the cam blank support assembly 320. A cam cutter 340 cuts a groove 342 in the periphery of the cam blank 341 as the cam blank is rotated by the X-direction drive system of the apparatus 10. By orienting the axis of rotation of the cam blank 341 in Y-directions and by moving the cam blank 341 along this axis as the cam blank 341 is rotated, the groove 342 is formed with portions which are axially displaced along the periphery of the cam blank. The Y-direction drive system of the apparatus 10 is adjustable, as has been explained, to vary the amplitude of this displacement.

Figure 12:
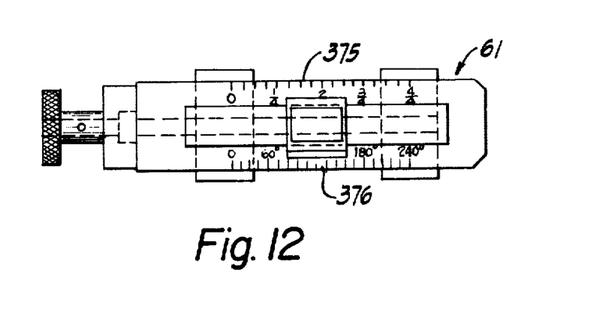
FIG. 12 is a plan view of a portion of one of the proportioning arms used in the apparatus of the present invention.

Referring to FIG. 12, the proportioning arms 61, 62 are preferably provided with scales which enable their proportioning ratios to be directly used. One such scale is illustrated at 375 as including the ratio readings 0, 1/4, 2/4, 3/4, 4/4. The arms 61, 62 may similarly be provided with scales calibrated in inches to directly read the length and amplitude of the cam being formed. The X-direction proportioning member 61 can also be provided with a scale 376 calibrated in degrees to indicate the degrees of rotation through which a cam blank will be rotated by the X-direction drive system in generating a cam on one of the cam blanks 331, 341.

As should now be apparent, the apparatus of the present invention provides a highly versatile system for generating many different types of cams from a single master cam. The ease with which master cams can be changed further enhances the versatility of the apparatus, permitting cam contours of complex configuration to be generated with relative ease.

Just as the described embodiment uses two proportioning drives to generate cams having two-dimensional contours, a third proportioning drive can be added to generate three-dimensional cams. In this regard, all of the drives can be used to translate a cam blank in mutually perpendicular directions, or one or more of the drives can be used to rotate the cam blank.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and the scope of the invention as hereinafter claimed.

What is claimed is:

1. A cam generating apparatus for moving a cam blank relative to a cam cutter to generate a cam contour from a master cam, comprising:
   a. a base structure;
   b. a pair of slides movably carried by said base structure for movement in mutually perpendicular directions;
   c. a master cam carried on one of said slides;
   d. a cam follower carried on the other of said slides and engageable with said master cam for moving said other slide in directions perpendicular to the movement of said one slide in accordance with the configuration of said master cam;
   e. first proportioning means connected to said one slide for generating an output which is proportional to the movement of said one slide;
   f. second proportioning means connected to said other slide for generating an output which is proportional to the movement of said other slide; and,
   g. cam blank support means connected to said first and second proportioning means for moving a cam blank relative to a cam cutter in response to said outputs to generate a cam contour on such cam blank.

2. The apparatus of claim 1 wherein both of said outputs are connected to said cam support means for translating said cam support means in mutually perpendicular directions in response to said outputs.

3. The apparatus of claim 1 wherein one of said outputs is connected to said cam support means for rotating the cam blank, and said other output is connected to said cam support means for translating the cam blank.

4. The apparatus of claim 3 wherein said other output is connected to said cam support for translating the cam blank along its axis of rotation.

5. The apparatus of claim 3 wherein said other output is connected to said cam support for translating the axis of rotation of the cam blank.

6. In a cam forming apparatus of the type including a cam cutter support for supporting a cam cutter and a cam blank support for supporting a cam blank to be cut, a drive system interposed between said supports for effecting relative movement between the cam blank and the cam cutter in accordance with the shape of a master cam, comprising:
   a. a base structure connected to one of said supports;
   b. slide means movably carried by said base structure and mounting a master cam for reciprocation in longitudinal directions;
   c. cam follower means movably carried by said base structure and engaging said master cam for reciprocation in lateral directions perpendicular to said longitudinal directions in response to movement of master cam in said longitudinal directions;
   d. first proportioning means interconnecting said slide means and the other of said supports for moving said other support proportionally to the movement of said slide means; and,
   e. second proportioning means interconnecting said cam follower means and said other support for moving said other support proportionally to the movement of said cam follower means.

7. The apparatus of claim 6 wherein one of said proportioning means is connected to said other support to rotate said other support.

8. The apparatus of claim 6 wherein said first and second proportioning means are connected to said other support for moving said other support in mutually perpendicular directions.

9. A cam generating apparatus for moving a cam blank relative to a cam cutter to generate a cam contour which is proportional in length and amplitude to that of a master cam, comprising:
   a. a base structure;
   b. an X-direction slide movably carried by said base structure for movement in X-directions;
   c. a Y-direction slide movably carried by said base structure for movement in Y-directions which are perpendicular to said X-directions;
   d. X-direction proportioning means connected to said X-direction slide for generating an X-direction output movement which is proportional to the X-direction movement of said X-direction slide;
   e. Y-direction proportioning means connected to said Y-direction slide for generating a Y-direction output which is proportional to the movement of said Y-direction slide;
   f. support means for supporting a cam blank for movement relative to said base structure;
   g. X-direction connection means interconnecting said X-direction proportioning means and said support means for moving said support means in response to said X-direction output movement;
   h. Y-direction connection means interconnecting said Y-direction proportioning arm and said support means for moving said support means in response to said Y-direction output movement;
   i. whereby, a cam blank positioned on said support means can be moved relative to a cam cutter to generate a cam contour which is proportional in amplitude and length to that of the master cam.

10. The apparatus of claim 9 wherein one of said connection means includes rotation means for rotating said support means in response to its associated output movement.

11. The apparatus of claim 9 wherein one of said connection means being one of means selectively connected to translate said support or to rotate said support in response to its associated output movement.

12. The apparatus of claim 6 wherein at least one of said proportioning means includes:

a. a body member pivotally connected to said base structure;

b. a slide member movably carried by said body member;

c. adjustment means interposed between said members to adjustably position said slide member along said body member;

d. one of said members being connected to the associated slide; and, e. the other of said members being connected through the associated connecting means to said support means.

* * * * *